C. J. FISK & E. LINDBLOM.
AUTO TIRE SAVING DEVICE.
APPLICATION FILED MAR. 9, 1914.
1,110,916.
Patented Sept. 15, 1914.
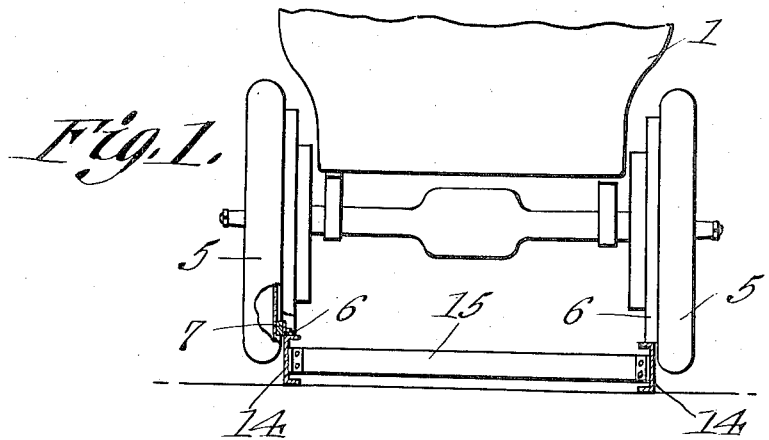
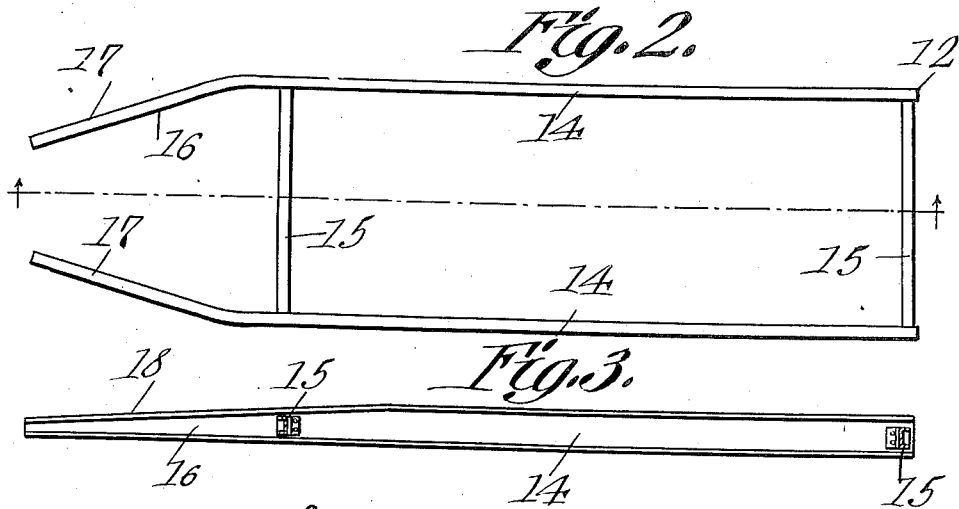
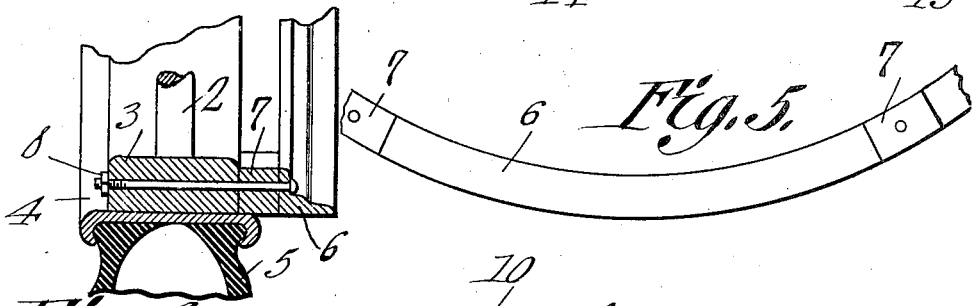
C. J. Fisk AND
E. Lindblom
Inventors
Witnesses
by
Attorneys

UNITED STATES PATENT OFFICE.

CHARLES J. FISK AND EDWARD LINDBLOM, OF BISMARCK, NORTH DAKOTA.

AUTO-TIRE-SAVING DEVICE.

1,110,916.  Specification of Letters Patent.  Patented Sept. 15, 1914.

Application filed March 2, 1914. Serial No. 823,527.

*To all whom it may concern:*

Be it known that we, CHARLES J. FISK and EDWARD LINDBLOM, citizens of the United States, residing at Bismarck, in the county of Burleigh and State of North Dakota, have invented a new and useful Auto-Tire-Saving Device, of which the following is a specification.

By way of explanation it may be stated that when a vehicle having yieldable or pneumatic tires stands for a considerable time in a shed or garage, supported solely by the tires, the tires deteriorate. In order to avoid this undesirable results jacks are commonly employed.

The present invention aims to provide a vehicle wheel having primary and secondary circumscribing tread members, the secondary tread member being of less extreme radius than the primary tread member, the tread members being disposed out of alinement, transversely of the wheel, and one lateral edge of the secondary tread member being free and exposed, for engagement with a track or frame, to the end that the primary tread member, which is commonly a pneumatic tire, may be supported in spaced relation to the floor of the garage.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 is a rear elevation of a vehicle supported in accordance with the present invention upon a track or frame which is shown in section; Fig. 2 is a top plan of the track or frame; Fig. 3 is a longitudinal section of the track or frame; Fig. 4 is a transverse section showing one form of wheel embodying the present invention; Fig. 5 is an elevation of the secondary tread member; Fig. 6 is a transverse section showing a modified form of the invention.

In the accompanying drawings the numeral 1 indicates a vehicle which may be of the ordinary motor propelled type, the wheels of the vehicle including spokes 2 supporting a felly 3 provided with a rim 4 of any desired construction, the rim being engaged with a yieldable or pneumatic tire 5. The felly 3 and the rim 4 may be described briefly as the body of the wheel.

An auxiliary rim 6 is provided, the same preferably being of annular form. Projecting laterally from the rim 6 are spaced blocks or shoulders 7 through which securing elements 8 pass, the securing elements 8 being bolts or the like which are engaged, in the present instance, with the felly 3.

In Fig. 6 of the drawings, a modified form of the invention is shown, the rim 9 being of the demountable type and being engaged with the tire 10. One part of the demountable rim 9 is equipped with a lateral flange 11 which corresponds to the auxiliary rim 6, the flange 11 preferably being formed integrally with one element of the demountable rim.

Supplemental to the structures above referred to there is provided a frame 12, shown in Figs. 1, 2 and 3. This frame 12 may be of various forms but in the present instance it is delineated as comprising side bars 14 connected by cross ties 15. At one end, the side bars 14 are prolonged to form guide arms 16. Viewed vertically, the guide arms 16 converge as at 17, so as to guide the wheels of a vehicle onto the side bars 14. Viewed horizontally, as in Fig. 3, the side arms 16 slope downwardly toward their free ends as indicated at 18, so as to ease the wheels up onto the side bars 14.

In practical operation, the vehicle 1 is run up onto the frame 12, the auxiliary rims 6 or their mechanical equivalents engaging the side bars 14 and the tires 5 thus being spaced apart from the ground, so that no weight is carried by the tires.

The device herein disclosed may be described as comprising primary and secondary tread members, the primary tread member being represented by the tire 5 and the secondary tread member being represented by the rim 6 or the flange 11. The secondary tread member is of less extreme radius than the primary tread member, meaning by "extreme radius" the radius from the center of the hub of the wheel to that portion of the secondary tread member which engages directly with the side bar 14. As clearly shown in Fig. 4, the primary and secondary tread members are disposed out of alinement transversely of the wheel. By "tread" we mean that part of the wheel which comes directly into contact with the ground, as distinguished from the base of a groove between two parallel circumscribing ground engaging ribs. One lateral edge of the secondary tread 6 is free and exposed, thereby differentiating from the base of a circumscribing groove in a tire of well known construction, the base of which groove is disposed between two circumscribing marginal tread ribs.

Preferably, the auxiliary rim 6 or its equivalent flange 11 is disposed upon the inner side of the wheel, but the particular location of the elements 6 and 11, so far as the respective sides of the wheel are concerned, may be varied without jeopardizing the utility of the invention.

Having thus described the invention, what is claimed is:—

In a device of the class described, a felly; a rim surrounding the felly and projecting laterally beyond the felly; circumferentially spaced blocks lodged in the angle defined by the felly and the laterally projecting portion of the rim; an auxiliary rim abutting against the lateral, outer faces of the blocks and spaced thereby from the felly; securing elements passing through the auxiliary rim, and the blocks and entering the felly; and a yieldable tire carried by the first specified rim and extended radially beyond the circumference of the auxiliary rim.

In testimony that we claim the foregoing as our own, we have hereto affixed our signatures in the presence of two witnesses.

CHARLES J. FISK.
EDWARD LINDBLOM.

Witnesses:
R. D. HOSKINS,
GEORGE F. WILL.